US008806601B2

(12) United States Patent  (10) Patent No.: US 8,806,601 B2
Sheehan  (45) Date of Patent: *Aug. 12, 2014

(54) NON-INTERACTIVE ENTITY APPLICATION PROXY METHOD AND SYSTEM

(75) Inventor: Alexander Brantley Sheehan, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 1537 days.

This patent is subject to a terminal disclaimer.

(21) Appl. No.: 12/039,839

(22) Filed: Feb. 29, 2008

(65) Prior Publication Data

US 2009/0222665 A1  Sep. 3, 2009

(51) Int. Cl.
*H04L 29/06* (2006.01)
*G06F 21/41* (2013.01)
*G06F 21/44* (2013.01)
*H04L 29/08* (2006.01)

(52) U.S. Cl.
CPC .............. *H04L 63/068* (2013.01); *G06F 21/41* (2013.01); *G06F 21/445* (2013.01); *H04L 29/06748* (2013.01); *H04L 29/08612* (2013.01); *H04L 63/06* (2013.01); *H04L 63/0815* (2013.01)
USPC ................ 726/8; 713/171; 709/227; 709/229

(58) Field of Classification Search
CPC ............ H04L 29/08612; H04L 63/068; H04L 63/0815; H04L 63/06; H04L 29/06748; G06F 21/41; G06F 21/44–21/445
USPC .......... 709/204, 227, 229, 230, 232; 713/171; 726/8
See application file for complete search history.

(56) References Cited

U.S. PATENT DOCUMENTS

| 6,449,643 | B1 | 9/2002 | Hyndman et al. |
| 6,453,339 | B1 | 9/2002 | Schultz et al. |
| 6,609,198 | B1 | 8/2003 | Wood et al. |
| 8,046,826 | B2 | 10/2011 | Sheehan |

(Continued)

FOREIGN PATENT DOCUMENTS

EP  0856974  8/1998

OTHER PUBLICATIONS

Webster's Online Dictionary. "Definition: interactivity". <http://www.websters-dictionary-online.org/definitions/interactivity>.*

(Continued)

*Primary Examiner* — Linglan Edwards
*Assistant Examiner* — Kevin Bechtel
(74) *Attorney, Agent, or Firm* — Schmeiser, Olsen & Watts; John R. Pivnichny (57) ABSTRACT

A security method and system. The method includes retrieving configuration data associated with a non interactive entity (NIE) software application. The configuration data comprises a refresh count, a refresh period, and a session ID. A master refresh period is calculated from the refresh period. Credentials data associated with the NIE software application are retrieved. The credentials data are transmitted to a resource server. A session key generated by the resource server is received by the NIE software application. The NIE software application calculates a stale time associated with the session key. The NIE software application generates a first updated refresh count. The NIE software application stores the session key, the first updated refresh count, the first refresh period, and the first specified stale time.

10 Claims, 6 Drawing Sheets

(56) References Cited

U.S. PATENT DOCUMENTS

| | | | |
|---|---|---|---|
| 8,176,540 | B2 | 5/2012 | Sheehan |
| 2003/0005178 | A1 | 1/2003 | Hemsath |
| 2003/0033523 | A1 | 2/2003 | McNulty et al. |
| 2003/0041263 | A1 | 2/2003 | Devine et al. |
| 2003/0149880 | A1 | 8/2003 | Shamsaasef et al. |
| 2003/0172290 | A1 | 9/2003 | Newcombe et al. |
| 2004/0006710 | A1 | 1/2004 | Pollutro et al. |
| 2004/0187036 | A1 | 9/2004 | Nakamura |
| 2005/0193137 | A1* | 9/2005 | Farnham ............... 709/230 |
| 2006/0070114 | A1* | 3/2006 | Wood et al. ............ 726/2 |
| 2006/0212706 | A1 | 9/2006 | Jiang et al. |
| 2007/0124342 | A1* | 5/2007 | Yamamoto et al. ........ 707/202 |
| 2007/0203983 | A1* | 8/2007 | Fukuhara et al. ........ 709/204 |
| 2007/0214497 | A1 | 9/2007 | Montgomery et al. |
| 2007/0248232 | A1* | 10/2007 | Driscoll et al. ........ 380/280 |
| 2007/0277235 | A1* | 11/2007 | Barrett et al. .......... 726/12 |
| 2008/0196101 | A1* | 8/2008 | Sade et al. ............ 726/22 |
| 2008/0209068 | A1* | 8/2008 | Herzog et al. .......... 709/232 |
| 2009/0234954 | A1 | 9/2009 | Sheehan |
| 2009/0235338 | A1 | 9/2009 | Sheehan |
| 2009/0235343 | A1 | 9/2009 | Sheehan |

OTHER PUBLICATIONS

Notification of Allowance and Fee(s) Due (Mail Date Jun. 16, 2011) for U.S. Appl. No. 12/049,483, filed Mar. 17, 2008; First Named Inventor: Alexander Brantley Sheehan.

Office Action (Mail Date Apr. 11, 2011) for U.S. Appl. No. 12/045,735, filed Mar. 11, 2008; First Named Inventor: Alexander Brantley Sheehan.

USPTO Office Action (Mail Date Feb. 28, 2011) for U.S. Appl. No. 12/049,483, filed Mar. 17, 2008; First Named Inventor: Alexander Brantley Sheehan.

U.S. Appl. No. 12/045,735, filed Mar. 11, 2008; First Named Inventor: Alexander Brantley Sheehan.

U.S. Appl. No. 12/045,741, filed Mar. 11, 2008; First Named Inventor: Alexander Brantley Sheehan.

Office Action (Mail Date Aug. 22, 2011) for U.S. Appl. No. 12/045,741, filed Mar. 11, 2008.

Office Action (Mail Date Aug. 23, 2011) for U.S. Appl. No. 12/045,735, filed Mar. 11, 2008.

Yuan, et al, Visualization Tools for Teaching Computer Security, Jan. 2010, Transactions on Computing Education (TOCE), vol. 9 Issue 4, Publisher: ACM, pp. 1-28.

Notice of Allowance (Mail Date Jan. 6, 2012) for U.S. Appl. No. 12/045,735, filed Mar. 11, 2008.

Office Action (Mail Date Dec. 19, 2013) for U.S. Appl. No. 12/045,741, filed Mar. 11, 2008.

Amendment filed Mar. 19, 2014 in response to Office Action (Mail Date Dec. 19, 2013) for U.S. Appl. No. 12/045,741, filed Mar. 11, 2008.

* cited by examiner

NON-INTERACTIVE ENTITY APPLICATION PROXY METHOD AND SYSTEM

FIELD OF THE INVENTION

The present invention relates to a method and associated system for maintaining a secure connection to a non-interactive entity software application which is used to proxy requests for resources.

BACKGROUND OF THE INVENTION

Maintaining secure connections between systems typically comprises an inefficient process with little flexibility. Accordingly, there exists a need in the art to overcome at least some of the deficiencies and limitations described herein above.

SUMMARY OF THE INVENTION

The present invention provides a security method comprising:

initializing, by a computing system comprising a non interactive entity (NIE) software application, said NIE software application, wherein said NIE software application comprises an internal session cache;

retrieving, by said NIE software application, configuration data associated with said NIE software application, wherein said configuration data comprises a refresh count associated with session key requests, a refresh period associated with said session key requests, and a session ID associated with said NIE software application;

calculating, by said NIE software application, a first master refresh period from said refresh period;

retrieving, by said NIE software application, credentials data associated with said NIE software application;

transmitting, by said NIE software application, said credentials data to a resource server;

receiving, by said NIE software application from said resource server, a first session key associated with said resource server;

calculating, by said NIE software application, a first specified stale time associated with said first session key, wherein said calculating said first specified stale time comprises adding said refresh period to a first current time;

generating, by said NIE software application from said refresh count, a first updated refresh count; and storing within said internal session cache, by said NIE software application, said first session key, said first updated refresh count, said first refresh period, and said first specified stale time.

The present invention provides a computing system comprising a processor coupled to a computer-readable memory unit, said memory unit comprising a non interactive entity (NIE) software application and instructions that when executed by the processor implements a security method, said method comprising:

initializing, by said computing system, said NIE software application, wherein said NIE software application comprises an internal session cache;

retrieving, by said NIE software application, configuration data associated with said NIE software application, wherein said configuration data comprises a refresh count associated with session key requests, a refresh period associated with said session key requests, and a session ID associated with said NIE software application;

calculating, by said NIE software application, a first master refresh period from said refresh period;

retrieving, by said NIE software application, credentials data associated with said NIE software application;

transmitting, by said NIE software application, said credentials data to a resource server;

receiving, by said NIE software application from said resource server, a first session key associated with said resource server;

calculating, by said NIE software application, a first specified stale time associated with said first session key, wherein said calculating said first specified stale time comprises adding said refresh period to a first current time;

generating, by said NIE software application from said refresh count, a first updated refresh count; and storing within said internal session cache, by said NIE software application, said first session key, said first updated refresh count, said refresh period, and said first specified stale time.

The present invention provides a computer program product, comprising a computer readable medium comprising a computer readable program code embodied therein, said computer readable program code adapted to implement a security method within a computing system comprising a memory device, said memory device comprising a non interactive entity (NIE) software application, said method comprising:

initializing, by said computing system, said NIE software application, wherein said NIE software application comprises an internal session cache;

retrieving, by said NIE software application, configuration data associated with said NIE software application, wherein said configuration data comprises a refresh count associated with session key requests, a refresh period associated with said session key requests, and a session ID associated with said NIE software application;

calculating, by said NIE software application, a first master refresh period from said refresh period;

retrieving, by said NIE software application, credentials data associated with said NIE software application;

transmitting, by said NIE software application, said credentials data to a resource server;

receiving, by said NIE software application from said resource server, a first session key associated with said resource server;

calculating, by said NIE software application, a first specified stale time associated with said first session key, wherein said calculating said first specified stale time comprises adding said refresh period to a first current time;

generating, by said NIE software application from said refresh count, a first updated refresh count; and storing within said internal session cache, by said NIE software application, said first session key, said first updated refresh count, said refresh period, and said first specified stale time.

The present invention provides a process for supporting computer infrastructure, said process comprising providing at least one support service for at least one of creating, integrating, hosting, maintaining, and deploying computer-readable code in a computing system comprising a computer-readable memory unit, wherein said computer-readable memory unit comprises a non interactive entity (NIE) software application, and wherein the code in combination with the computing system is capable of performing a security method, said method comprising:

initializing, by said computing system, said NIE software application, wherein said NIE software application comprises an internal session cache;

retrieving, by said NIE software application, configuration data associated with said NIE software application, wherein said configuration data comprises a refresh count associated with session key requests, a refresh period associated with said session key requests, and a session ID associated with said NIE software application;

calculating, by said NIE software application, a first master refresh period from said refresh period;

retrieving, by said NIE software application, credentials data associated with said NIE software application;

transmitting, by said NIE software application, said credentials data to a resource server;

receiving, by said NIE software application from said resource server, a first session key associated with said resource server;

calculating, by said NIE software application, a first specified stale time associated with said first session key, wherein said calculating said first specified stale time comprises adding said refresh period to a first current time;

generating, by said NIE software application from said refresh count, a first updated refresh count; and storing within said internal session cache, by said NIE software application, said first session key, said first updated refresh count, said refresh period, and said first specified stale time.

The present invention advantageously provides a simple method and associated system capable of maintaining secure connections between systems.

DETAILED DESCRIPTION OF THE INVENTION

Figure 1:
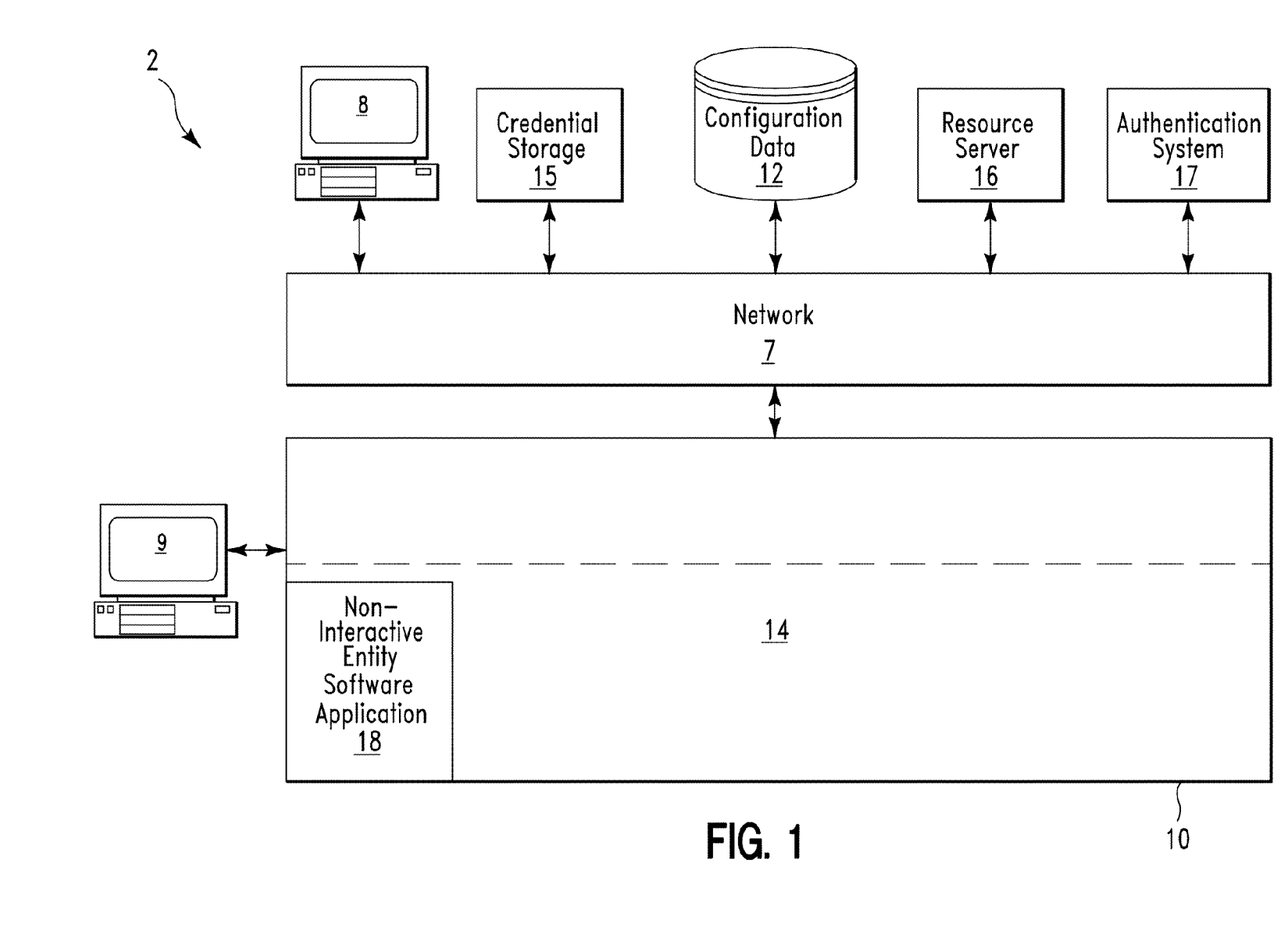
FIG. 1 illustrates a system for providing a secure means to initialize and maintain a secure connection to and from a non-interactive entity software application, in accordance with embodiments of the present invention.

FIG. 1 illustrates a system 2 for providing a secure means to initialize and maintain a secure connection to and from a non-interactive entity software application 18 through which requests for resources may be serviced, in accordance with embodiments of the present invention. System 2 of FIG. 1 comprises a computing apparatus 8, a (secure) credential storage device 15, a configuration data store 12, a resource server 16 (e.g., a session-key-secured computing resource server), and an authentication system 17 connected to a computing system 10 through a network 7. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 comprises a memory system 14 (e.g., an application server). Memory system 14 may comprise a single memory system (e.g., a single application server). Alternatively, memory system 14 may comprise a plurality of memory systems (e.g., multiple application servers). Memory system 14 comprises non-interactive entity software application 18. Computing apparatus 8 is used by a requestor (i.e., an entity that requests resources) in order to request a resource(s) (e.g., an application menu item) from resource server 16. A requester may comprise a person, a software application, or a portion of a software application. System 2 may comprise an optional access terminal 9 connected to computing system 10. Optional access terminal 9 may be used to access non-interactive entity software application 18. Non-interactive entity software application 18 comprises application software that acts as a proxy between a requester and resource server 16. Non-interactive entity software application 18 manages an internal session cache (e.g., internal session cache 18b in FIG. 4), forwards requests to resource server 16, and returns results (i.e., resources) to the requester.

System 2 retrieves credentials (e.g., a user ID and password) for non-interactive entity software application 18 from credential storage device 15 and submits the credentials to resource server 16 which returns a session key as a result of a successful authentication attempt with authentication system 17. A session key is defined herein as a string of characters that acts as a ticket to access resources in resource server 16. Non-interactive entity software application 18 stores the session key along with a time stamp indicating a valid remaining lifetime for the issued session key. Additionally, non-interactive entity software application 18 stores configuration data (i.e., retrieved from configuration data store 12) for the issued session key. Configuration data may comprise a refresh count, a refresh period, a session ID (i.e., for identifying non-interactive entity software application 18), and a stale time. A refresh count is defined herein as a sequential, numerical value that indicates a number of times that a session key may be refreshed by the computing resource server's authentication process (i.e., authentication system 17) before the credentials must be read again from the secure storage location. A refresh period is defined herein as a time period that non-interactive entity software application 18 uses to calculate how frequently data in a session cache (i.e., internal to non-interactive entity software application 18) should be checked to determine if a session refresh attempt should occur. A stale time is defined herein as a date/time at which a validity of a current session key will expire.

The following process steps illustrate a session key transfer process performed by system 2:

1. Non-interactive entity software application 18 retrieves its credentials from (secure) credential storage device 15.

2. Non-interactive entity software application 18 sends the credentials to resource server 16, which has a pre-established trust relationship with authentication system 17.

3. Resource server creates, stores, and manages a session key in response to a successful authentication by non-interactive entity software application 18. The session key may comprise an associated life span, which may be returned by authentication system 17 or stored locally for non-interactive entity software application 18 by another administrative process.

4. An identifier, session key, and data representing the session key's life time (i.e., for non-interactive entity software application 18) are stored in an internal (i.e., to non-interactive entity software application 18) session cache (i.e., session cache 18b in FIG. 4).

5. An iterative process will run repeatedly against the session cache in order to keep the stored session key currently valid with resource server 16 and authentication system 17. A refresh count in the session cache will indicate how many times a session key may be obtained by making a light, quick call to resource server 16, which will return a fresh, new session key. The aforementioned session key refresh process does not require that the actual non-interactive entity software application 18 credentials be transmitted. A fresh, new session key is obtained by passing a valid (almost expired) session key to resource server 16. The iterative process of refreshing the session key will continue until a pre-configured refresh count has been reached.

6. When a requester submits a resource request, non-interactive entity software application 18 queries the session cache for a matching requester Id. If a matching requester Id is found, the requestor's valid session key is immediately returned. If a matching requester Id is not found in the session cache, then non-interactive entity software application 18 must perform the authentication on behalf of the requestor. Additionally, non-interactive entity software application 18 may request the resource on behalf of the requester with the fresh session key. Since the resource request was made with a valid session key, resource server 16 performs a resource retrieval process and returns the requested resource to the non-interactive entity software application 18, which returns the requested resource to the requester.

Figure 2:
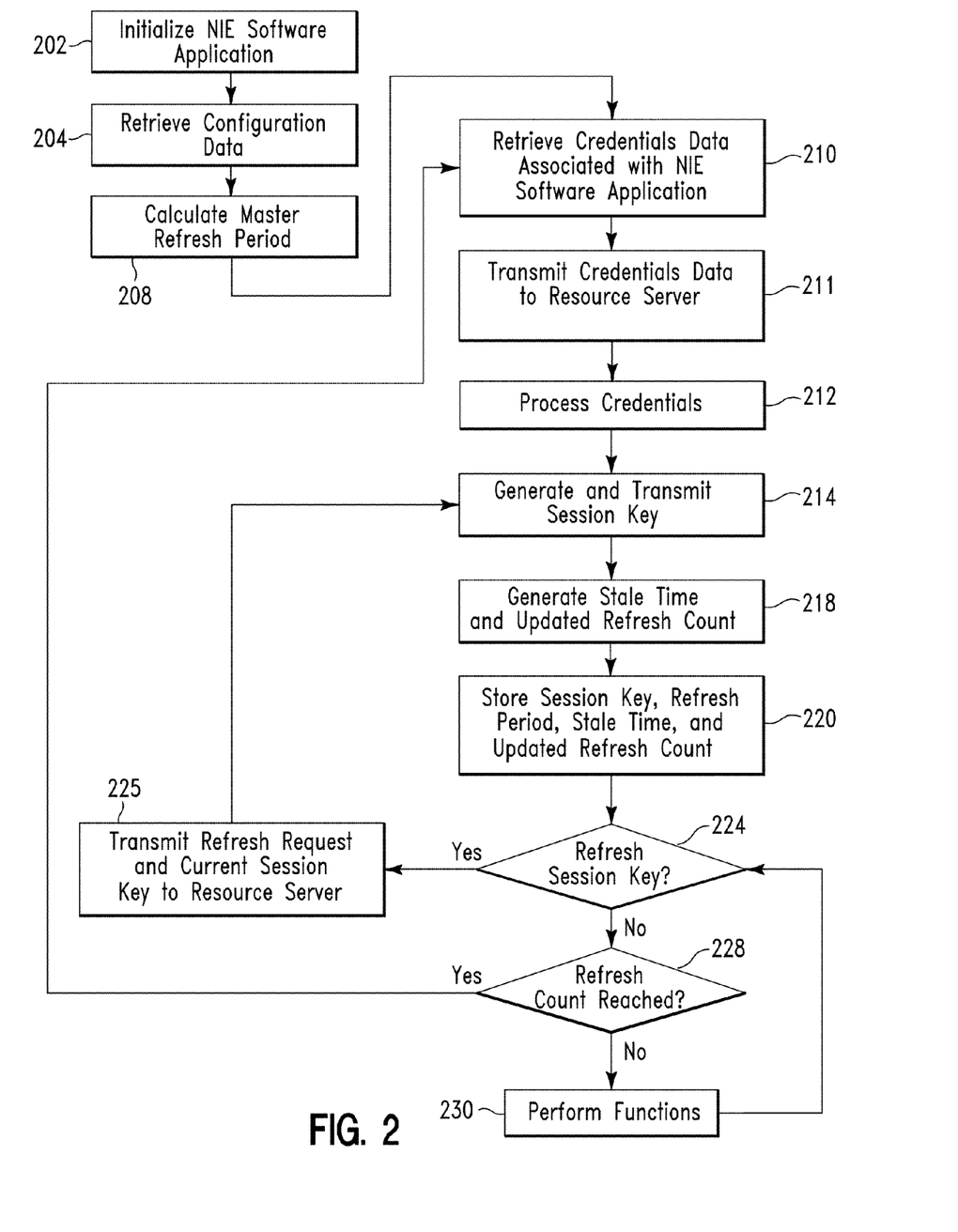
FIG. 2 illustrates a flowchart describing an algorithm used by the system of FIG. 1 for generating and refreshing a session key, in accordance with embodiments of the present invention.

FIG. 2 illustrates a flowchart describing an algorithm used by system 2 of FIG. 1 for generating and refreshing a session key, in accordance with embodiments of the present invention. In step 202, non-interactive entity software application 18 (i.e., from FIG. 1) is initialized. In step 204, non-interactive entity software application 18 retrieves configuration data from a storage location (e.g., data store 12 in FIG. 1). The configuration data may include a refresh count and a refresh period associated with session key requests and a session ID associated with non-interactive entity software application 18. In step 208, non-interactive entity software application 18 calculates a master refresh period from the refresh period retrieved from the configuration data. The master refresh period may be calculated by subtracting a very small time period (e.g., a millisecond) from the refresh period. In step 210, non-interactive entity software application 18 retrieves credentials data (i.e., associated with non-interactive entity software application 18) from a secure credential storage device (e.g., credential storage 15 in FIG. 1). Optionally, credentials data could be stored inline (e.g., hard coded in non-interactive entity software application 18 source code). Credentials data may comprise a user ID and password for non-interactive entity software application 18. In step 211, non-interactive entity software application 18 transmits the credentials data to a resource server (e.g., resource server 16 in FIG. 1). In step 212, the credentials data is processed in order to authenticate non-interactive entity software application 18. The processing performed in step 212 may comprise the following steps:

1. The resource server transmits the credentials data (i.e., for non-interactive entity software application 18) to an authentication system (e.g., authentication system 17 in FIG. 1) in order to generate an authentication attempt.

2. The authentication system returns a result associated with the authentication attempt. If authentication attempt is successful, a value indicating "success" is returned to the resource server.

In step 214 (i.e., upon a successful non-interactive entity software application 18 authentication), the resource server generates a session key, which has its lifetime encoded in the session key "ticket". The resource server transmits the session key to non-interactive entity software application 18. In step 218, non-interactive entity software application 18 generates a stale time and updated refresh count associated with the session key. The stale time is calculated by adding the master refresh period (i.e., from step 208) to a current time. In step 220, the session key, the updated refresh count, the stale time, and the session ID (i.e., for non-interactive entity software application 18) are stored within an internal session cache within non-interactive entity software application 18. In step 224, it is periodically determined if the session key should be refreshed. If in step 224, it is determined that the session key should be refreshed then in step 225, a refresh request and the current session key is transmitted to the resource server and step 214 is executed. If in step 224, it is determined that the session key should not be refreshed then in step 228 it is determined if the refresh count has been reached. If in step 228 it is determined that the refresh count has been reached then step 210 is executed. If in step 228 it is determined that the refresh count has not been reached then in step 230 non-interactive entity software application 18 performs intended functions and periodically executes step 224.

Figure 3:
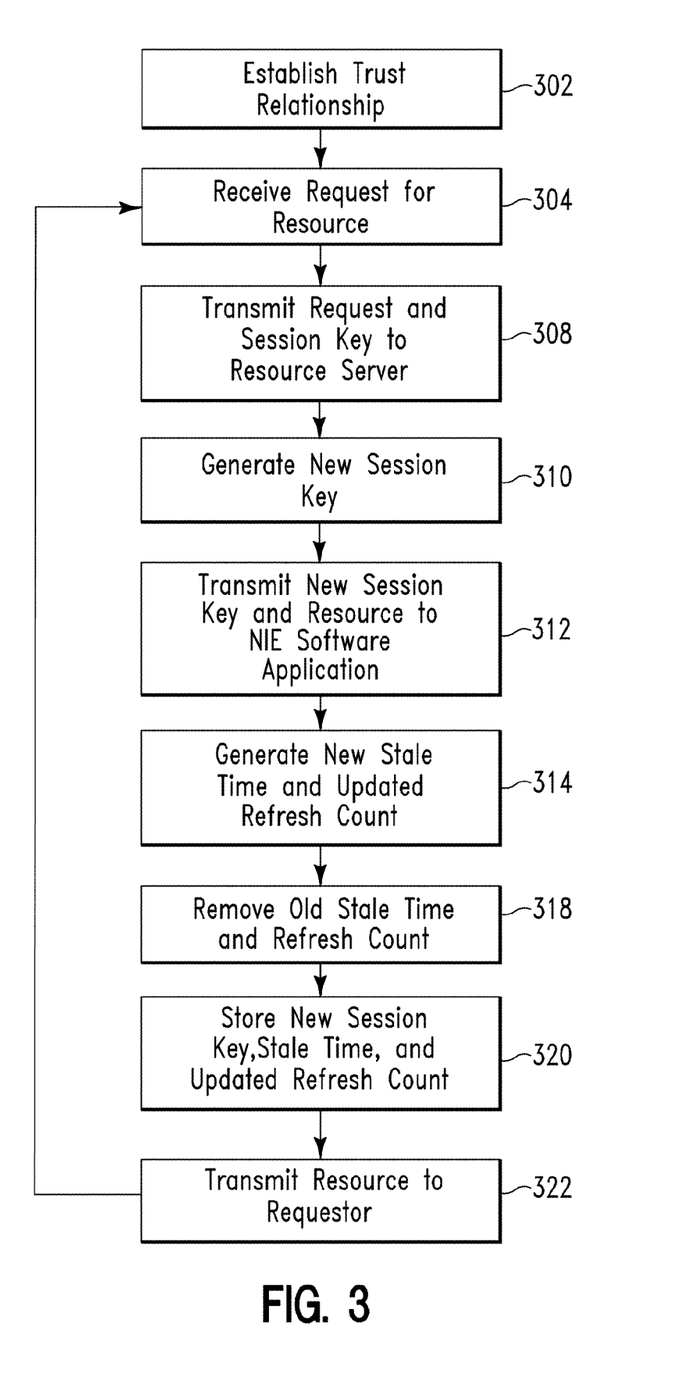
FIG. 3 illustrates a flowchart describing an algorithm used by the system of FIG. 1 for executing a resource request, in accordance with embodiments of the present invention.

FIG. 3 illustrates a flowchart describing an algorithm used by system 2 of FIG. 1 for executing a resource request, in accordance with embodiments of the present invention. In step 302, a trust relationship (i.e., a login process) between a requestor and non-interactive entity software application 18 (i.e., from FIG. 1) is established. Alternatively, a pre-established trust relationship between a requester and non-interactive entity software application 18 may be loaded into non-interactive entity software application 18. In step 304, non-interactive entity software application 18 receives (from a requester) a request for a resource. In step 308, non-interactive entity software application 18 transmits a current session key (i.e., generated in step 214 of FIG. 2) and the request to a resource server. In step 310, the resource server generates a new session key. In step 312, the resource server transmits the new session key and the requested resource to non-interactive entity software application 18. In step 314, a new stale time and updated refresh count is generated. In step 318, a previous stale time and refresh count are removed from an internal session cache within non-interactive entity software application 18. In step 320, the new session key, the new stale time, and the updated refresh count are each stored in the internal session cache within non-interactive entity software application 18. In step 322, the requested resource is transmitted to the requester and step 304 is repeated (i.e., for a same requester or a different requestor).

Figure 4:
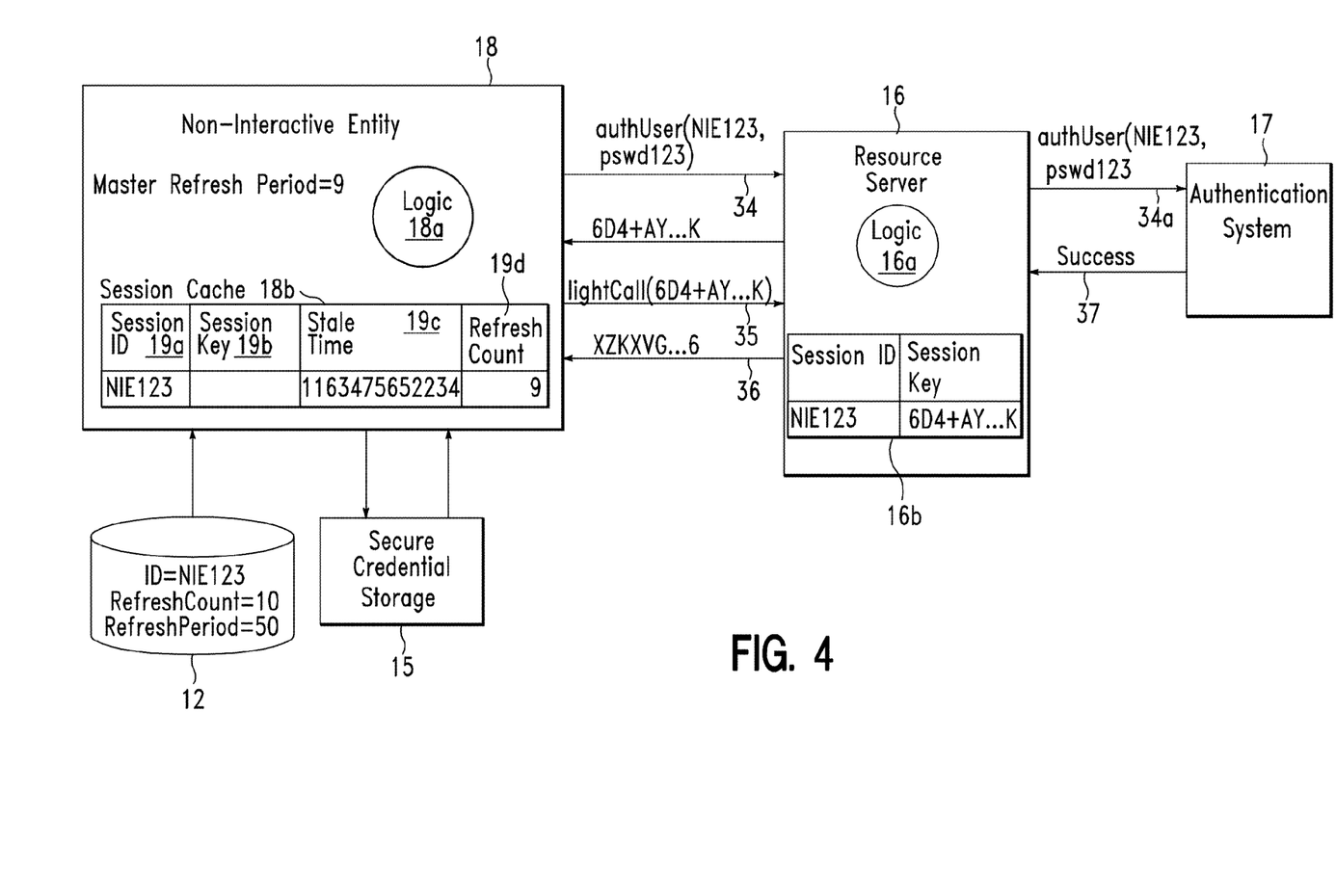
FIG. 4 illustrates a component diagram describing a usage process for implementing the algorithm of FIG. 2, in accordance with embodiments of the present invention.

FIG. 4 illustrates a component diagram describing a usage process for implementing the algorithm of FIG. 2 for generating and refreshing a session key, in accordance with embodiments of the present invention. The usage process illustrates an initialization process for system 2 of FIG. 1 (i.e., a process executed to setup and maintain a session cache of fresh session keys that may be used to improve the performance of a resource request handling process). Non interactive entity software application 18 is a software program that maintains a secure connection with resource server 16 and acts as a proxy for servicing requests for resources from requesters. Session cache 18b is an internal data storage mechanism used by non interactive entity software application 18 to store session related data which includes a Session Id 19a (i.e., identifies the entity making the request for resources), a session key 19b (i.e., a string of characters that acts as a ticket to access resources of resource server 16), a stale time 19*c* (i.e., a date/time at which a validity of the session key 19*b* will expire), and a refresh count 19*d* (a number of iterations in which the non interactive entity software application 18 will continue to make light-weight calls to resource server 16 in order to refresh a session key 19*b* for this session). Non interactive entity software application 18 comprises internal logic 18*a* for performing processing. Logic 18*a* is used to keep session keys alive/valid so that subsequent resource requests may be immediately serviced without a need to authenticate each and every request from requestor. Configuration data store 12 comprises a storage mechanism for configuration data. Configuration data may include a refresh count (non interactive entity software application 18 takes this value and for an initial session cache record insertion) and a refresh period (a time, e.g., a number of seconds between non interactive entity software application 18 scans of the session cache in which the non interactive entity software application 18 may refresh the session key(s)). Secure credential storage comprises a storage device for storing the credentials associated with non interactive entity software application 18.

The following process steps illustrate a process for generating and refreshing a session key:

1. Resource server 16 accepts requests for resources and services the requests after resource server 16 authenticates non interactive entity software application 18 using it's credentials or validates that a session key (e.g., session key 19*b*) passed to resource server 16 is valid. Additionally, resource server 16 generates the session key and stores the session key with its associated Session Id for subsequent request processing.
2. Logic 16*a* performs an authentication of non interactive entity software application 18, creates the session key, stores the session Id and it's associated session key, and determines a validity of the session key values passed to it by non interactive entity software application 18 when the non interactive entity software application 18 requests resources.
3. Internal storage mechanism 16*b* of resource server 16 comprises a storage location for storing the session key with its associated session Id.
4. Authentication system 17 services user (non interactive entity software application 18) authentication requests for the resource server. For example, authentication system 17 may allow resource server 16 to send a user Id and password which it will then check for validity.
5. Non interactive entity software application 18 transmits an authentication request 34 to resource server 16. The authentication request performed at initial startup or when the refresh count has been reached.
6. A session key (e.g., 6D4+AY . . . K) is returned by resource server 16 to non interactive entity software application 18.
7. A session key refresh attempt 35 is made by non interactive entity software application 18. A session key refresh attempt 35 comprises performing a light-weight request (i.e., performed by non interactive entity software application 18) of resource server 16 (e.g., getTime ("6D4+AY . . . K")) in which it passes the currently valid session key.
8. Resource server 16 generates a new session key 36 whose lifetime has been reset to a time determined by resource server 16. Note that the reset lifetime should be greater than a stale time (e.g., stale time 19*c*) stored in the record for this session key in session cache 18*b*.
9. Resource server 16 transmits an authentication request 34*a* to authentication system 17 to authenticate non interactive entity software application 18.
10. Resource server 16 returns a value of success 37 (e.g., true/yes/1) if the authentication process validates the passed credentials.

Figure 5:
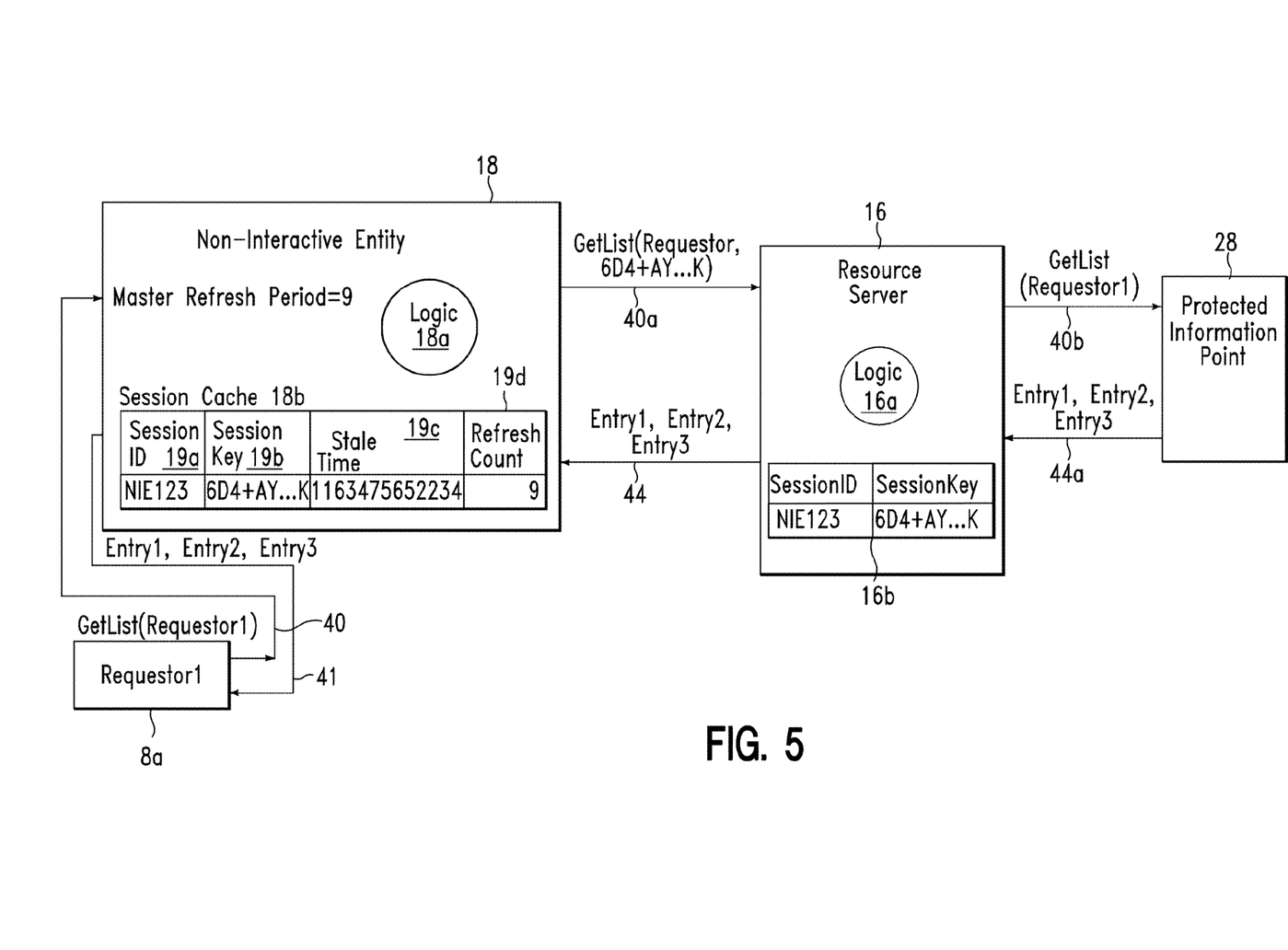
FIG. 5 illustrates a component diagram describing a usage process for implementing the algorithm of FIG. 3, in accordance with embodiments of the present invention.

FIG. 5 illustrates a component diagram describing a usage process for implementing the algorithm of FIG. 3 for handling requests for resources, in accordance with embodiments of the present invention. The requests for resources are generated by a requester 8*a*. Non interactive entity software application 18 and resource sever 16 in FIG. 5 have been described with reference to FIG. 4, supra. A protected information point 28 comprises requested resources.

The following process steps illustrate a process for handling requests for resources (i.e., after session cache 18*b* has been filled with fresh session keys):

1. A request for resources 40 is transmitted by requester 8*a* to non interactive entity software application 18. For example, request for resources 40 in FIG. 5 comprises getList (Requestor1). Note that a trust relationship has been established between requestor 8*a* and non interactive entity software application 18 prior to requester 8*a* generating request for resources 40.
2. Results 41 (e.g., Entry 1, Entry2, Entry3) to request for resources 40 are returned by non interactive entity software application 18 to requester 8*a* as a result of processing its request
3. A request for resources 40*a* is transmitted from non interactive entity software application 18 to resource server 16 on behalf of requester 8*a*. Note that request for resources 40*a* comprises session key 19*b*. Resource server 16 validates session key 19*b* and processes request for resources 40*a* if session key 19*b* is valid.
4. Results 44 are returned from resource server 16 to non interactive entity software application 18 as a result of processing request for resources 40*a*.
5. A request for resources 40*b* is transmitted from resource server 16 to protected information point 28.
6. Results 44*a* are returned from protected information point 28 to resource server 16 as a result of processing request for resources 40*b*.

Figure 6:
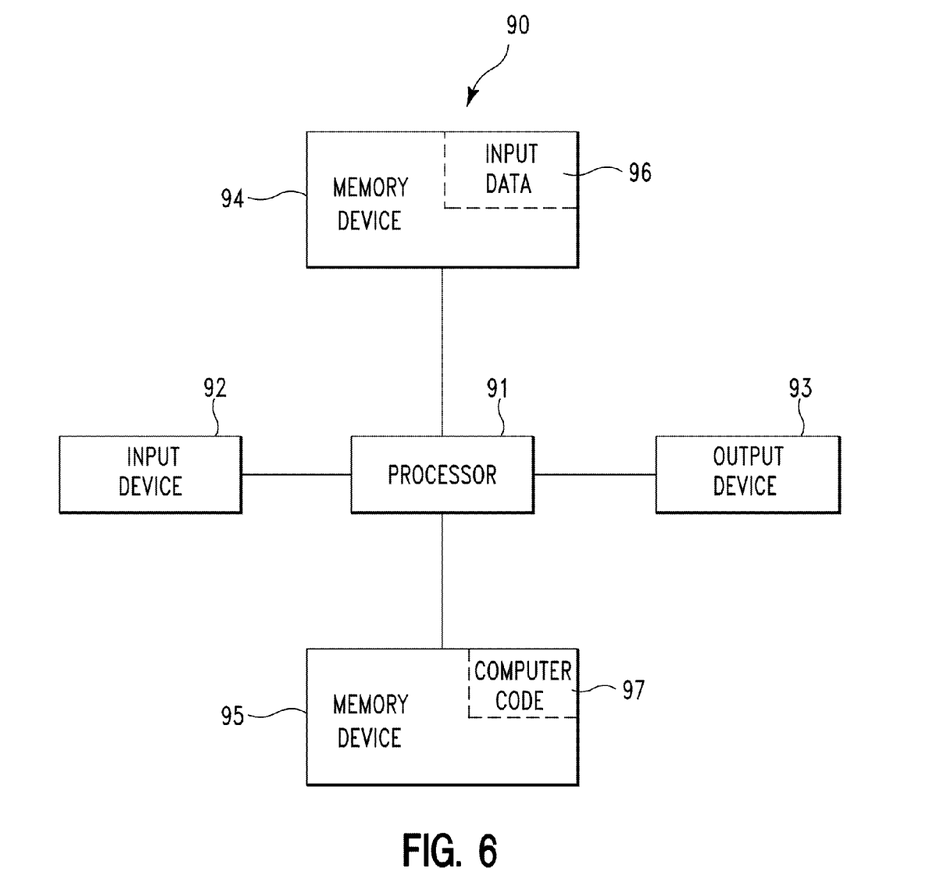
FIG. 6 illustrates a computer apparatus used for providing a secure means to initialize and maintain a secure connection to and from a non-interactive entity software application, in accordance with embodiments of the present invention.

FIG. 6 illustrates a computer apparatus 90 (e.g., computing system 10 of FIG. 1) used for providing a secure means to initialize and maintain a secure connection to and from a non-interactive entity software application, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for providing a secure means to initialize and maintain a secure connection to and from a non-interactive entity software application. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to provide a secure means to initialize and maintain a secure connection to and from a non-interactive entity software application. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for providing a secure means to initialize and maintain a secure connection to and from a non-interactive entity software application. In another embodiment, the invention provides a business method that performs the process steps of the invention on a subscription, advertising, and/or fee basis. That is, a service provider, such as a Solution Integrator, could offer to provide a secure means to initialize and maintain a secure connection to and from a non-interactive entity software application. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A security method comprising:

initializing, by a computing system comprising a proxy software application, said proxy software application, wherein said proxy software application comprises an internal session cache and internal logic configured to determine a validity of session key values passed to it by said proxy software application when said software application requests resources, wherein said internal session cache comprises an internal data structure within said proxy software application, and wherein the internal data structure comprises an organizational table structure for storing session IDs, session keys, stale times, and refresh counts within columns;

retrieving, by a computer processor of said computing system executing said proxy software application from a configuration data store external to said proxy software application, configuration data associated with said proxy software application, wherein said configuration data consists of a refresh count associated with session key requests, a refresh period associated with said session key requests, and a session ID associated with said proxy software application, and wherein said refresh period comprises a time between periodic scans of said session cache in which said proxy software application may refresh session keys, and wherein said refresh count comprises a number of iterations in which said proxy software application will continue to make light-weight calls to a resource server in order to refresh current session keys;

calculating, by said computer processor of said computing system executing said proxy software application, a first master refresh period by subtracting a specified time period from said refresh period;

retrieving, by said computer processor executing said proxy software application from said proxy software application, credentials data associated with said proxy software application, said credentials data consisting of a user ID and password for said proxy software application, said credentials data hardcoded within source code of said proxy software application;

establishing, by said computer processor executing said proxy software application, secure communications between a first requestor, said proxy software application, and said resource server;

transmitting, by said proxy software application, said credentials data to said resource server;

processing, by said computer processor, said credentials data, wherein said processing said credentials data comprises:
 transmitting said credentials data to an authentication system to generate an authentication attempt; and
 receiving a result value associated with said authentication attempt;

receiving, by said computer processor executing said proxy software application from a table structure within said resource server, a first session key comprising a string of characters for accessing resources in said resource server, wherein said first session key comprises a reset lifetime indicating a valid remaining lifetime remaining for the first session key encoded within said first session key;

generating, by said computer processor executing said proxy software application, a first specified stale time associated with a date and time at which a validity of said first session key will expire, wherein said generating said first specified stale time comprises adding said master refresh period to a first current time, and wherein said reset lifetime is greater than said first specified stale time;

generating, by said proxy software application from said refresh count, a first updated refresh count;

storing within said internal session cache, by said proxy software application, said session ID, said first session key, said first updated refresh count, said first refresh period, and said first specified stale time;

periodically determining, by said proxy software application, if the first session key should be refreshed; and refreshing the first session key when the proxy software application determines that the first session key should be refreshed, wherein said refreshing occurs iteratively until a pre-configured refresh count has been reached, and wherein said refreshing comprises:
 transmitting, by said proxy software application to said resource server, a request for a new session key;

retrieving, by said proxy software application from said internal session cache, said first session key;

transmitting, by said proxy software application to said resource server, said first session key, wherein said first session key currently comprises a valid and almost expired session key;

receiving, by said proxy software application from said resource server in response to said request, a second session key associated with said resource server;

calculating, by said proxy software application, a second specified stale time associated with said second session key, wherein said calculating said second specified stale time comprises adding said master refresh period to a second current time;

generating, by said proxy software application from said first updated refresh count, a second updated refresh count;

removing, by said proxy software application from said internal session cache, said first specified stale time and said first updated refresh count; and storing within said internal session cache, by said proxy software application, said second session key, said second updated refresh count, and said second specified stale time.

2. The method of claim 1, further comprising:

establishing, by said proxy software application, a trust relationship between said proxy software application and a requestor;

receiving, by said proxy software application from said requestor, a resource request for retrieving a resource from said resource server;

retrieving, by said proxy software application from said internal session cache, said second session key;

transmitting, by said proxy software application to said resource server, said resource request and said second session key;

receiving, by said proxy software application from said resource server in response to said resource request, a third session key and a first resource;

calculating, by said proxy software application, a third specified stale time associated with said third session key, wherein said calculating said third specified stale time comprises adding said refresh period to a third current time;

generating, by said proxy software application, a third updated refresh count;

removing, by said proxy software application from said internal session cache, said second specified stale time and said second updated refresh count;

storing within said internal session cache, by said proxy software application, said third session key, said third updated refresh count, and said third specified stale time; and transmitting, by said proxy software application, said first resource to said requester.

3. The method of claim 1, wherein said generating said first updated refresh count comprises decrementing said refresh count.

4. The method of claim 1, further comprising:

providing at least one support service for at least one of creating, integrating, hosting, maintaining, and deploying computer-readable code in the computing system, said code being executed by the computer processor to perform said initializing, said retrieving said configuration data, said calculating said first master refresh period, said retrieving said credentials data, said establishing, said transmitting said credentials data, said processing, said receiving said first session key, said generating said first specified stale time, said generating said first updated refresh count, said storing said session ID, said first session key, said first updated refresh count, said first refresh period, and said first specified stale time, said periodically, determining, said transmitting said request, said retrieving said first session key, said transmitting said first session key, said receiving said second session key, said calculating said second specified stale time, said generating said second updated refresh count, said removing, and said storing said second session key, said second updated refresh count, and said second specified stale time.

5. A computing system comprising a computer processor coupled to a computer-readable memory unit, said memory unit comprising a proxy software application and instructions that when executed by the computer processor implements a security method, said method comprising:

initializing, by said computing system, said proxy software application, wherein said proxy software application comprises an internal session cache and internal logic configured to determine a validity of session key values passed to it by said proxy software application when said software application requests resources, wherein said internal session cache comprises an internal data structure within said proxy software application, and wherein the internal data structure comprises an organizational table structure for storing session IDs, session keys, stale times, and refresh counts within columns;

retrieving, by a computer processor of said computing system executing said proxy software application from a configuration data store external to said proxy software application, configuration data associated with said proxy software application, wherein said configuration data consists of a refresh count associated with session key requests, a refresh period associated with said session key requests, and a session ID associated with said proxy software application, and wherein said refresh period comprises a time between periodic scans of said session cache in which said proxy software application may refresh session keys, and wherein said refresh count comprises a number of iterations in which said proxy software application will continue to make light-weight calls to a resource server in order to refresh current session keys;

calculating, by said computer processor of said computing system executing said proxy software application, a first master refresh period by subtracting a specified time period from said refresh period;

retrieving, by said computer processor executing said proxy software application from said proxy software application, credentials data associated with said proxy software application, said credentials data consisting of a user ID and password for said proxy software application, said credentials data hardcoded within source code of said proxy software application;

establishing, by said computer processor executing said proxy software application, secure communications between a first requestor, said proxy software application, and said resource server;

transmitting, by said proxy software application, said credentials data to said resource server;

processing, by said computer processor, said credentials data, wherein said processing said credentials data comprises:

transmitting said credentials data to an authentication system to generate an authentication attempt; and receiving a result value associated with said authentication attempt;

receiving, by said computer processor executing said proxy software application from a table structure within said resource server, a first session key comprising a string of characters for accessing resources in said resource server, wherein said first session key comprises a reset lifetime indicating a valid remaining lifetime remaining for the first session key encoded within said first session key;

generating, by said computer processor executing said proxy software application, a first specified stale time associated with a date and time at which a validity of said first session key will expire, wherein said generating said first specified stale time comprises adding said master refresh period to a first current time, and wherein said reset lifetime is greater than said first specified stale time;

generating, by said proxy software application from said refresh count, a first updated refresh count;

storing within said internal session cache, by said proxy software application, said session ID, said first session key, said first updated refresh count, said first refresh period, and said first specified stale time;

periodically determining, by said proxy software application, if the first session key should be refreshed; and refreshing the first session key when the proxy software application determines that the first session key should be refreshed, wherein said refreshing occurs iteratively until a pre-configured refresh count has been reached, and wherein said refreshing comprises:

transmitting, by said proxy software application to said resource server, a request for a new session key;

retrieving, by said proxy software application from said internal session cache, said first session key;

transmitting, by said proxy software application to said resource server, said first session key;

receiving, by said proxy software application from said resource server in response to said request, a second session key associated with said resource server;

calculating, by said proxy software application, a second specified stale time associated with said second session key, wherein said calculating said second specified stale time comprises adding said master refresh period to a second current time;

generating, by said proxy software application from said first updated refresh count, a second updated refresh count;

removing, by said proxy software application from said internal session cache, said first specified stale time and said first updated refresh count; and storing within said internal session cache, by said proxy software application, said second session key, said second updated refresh count, and said second specified stale time.

6. The computing system of claim 5, wherein said method further comprises:

establishing, by said proxy software application, a trust relationship between said proxy software application and a requestor;

receiving, by said proxy software application from said requestor, a resource request for retrieving a resource from said resource server;

retrieving, by said proxy software application from said internal session cache, said second session key;

transmitting, by said proxy software application to said resource server, said resource request and said second session key;

receiving, by said proxy software application from said resource server in response to said resource request, a third session key and a first resource;

calculating, by said proxy software application, a third specified stale time associated with said third session key, wherein said calculating said third specified stale time comprises adding said refresh period to a third current time;

generating, by said proxy software application, a third updated refresh count;

removing, by said proxy software application from said internal session cache, said second specified stale time and said second updated refresh count;

storing within said internal session cache, by said proxy software application, said third session key, said third updated refresh count, and said third specified stale time; and transmitting, by said proxy software application, said first resource to said requester.

7. The computing system of claim 5, wherein said generating said first updated refresh count comprises decrementing said refresh count.

8. A computer program product, comprising a computer readable storage device storing a computer readable program code, said computer readable program code configured to implement a security method within a computing system comprising a memory device, said memory device comprising a proxy software application, said method comprising:

initializing, by said computing system, said proxy software application, wherein said proxy software application comprises an internal session cache and internal logic configured to determine a validity of session key values passed to it by said proxy software application when said software application requests resources, wherein said internal session cache comprises an internal data structure within said proxy software application, and wherein the internal data structure comprises an organizational table structure for storing session IDs, session keys, stale times, and refresh counts within columns;

retrieving, by a computer processor of said computing system executing said proxy software application from a configuration data store external to said proxy software application, configuration data associated with said proxy software application, wherein said configuration data consists of a refresh count associated with session key requests, a refresh period associated with said session key requests, and a session ID associated with said proxy software application, and wherein said refresh period comprises a time between periodic scans of said session cache in which said proxy software application may refresh session keys, and wherein said refresh count comprises a number of iterations in which said proxy software application will continue to make light-weight calls to a resource server in order to refresh current session keys;

calculating, by said computer processor of said computing system executing said proxy software application, a first master refresh period by subtracting a specified time period from said refresh period;

retrieving, by said computer processor executing said proxy software application from said proxy software application, credentials data associated with said proxy software application, said credentials data consisting of a user ID and password for said proxy software application, said credentials data hardcoded within source code of said proxy software application;

establishing, by said computer processor executing said proxy software application, secure communications between a first requestor, said proxy software application, and said resource server;

transmitting, by said proxy software application, said credentials data to said resource server;

processing, by said computer processor, said credentials data, wherein said processing said credentials data comprises:
  transmitting said credentials data to an authentication system to generate an authentication attempt; and
  receiving a result value associated with said authentication attempt;

receiving, by said computer processor executing said proxy software application from a table structure within said resource server, a first session key comprising a string of characters for accessing resources in said resource server, wherein said first session key comprises a reset lifetime indicating a valid remaining lifetime remaining for the first session key encoded within said first session key;

generating, by said computer processor executing said proxy software application, a first specified stale time associated with a date and time at which a validity of said first session key will expire, wherein said generating said first specified stale time comprises adding said master refresh period to a first current time, and wherein said reset lifetime is greater than said first specified stale time;

generating, by said proxy software application from said refresh count, a first updated refresh count;

storing within said internal session cache, by said proxy software application, said session ID, said first session key, said first updated refresh count, said first refresh period, and said first specified stale time;

periodically determining, by said proxy software application, if the first session key should be refreshed; and refreshing the first session key when the proxy software application determines that the first session key should be refreshed, wherein said refreshing occurs iteratively until a pre-configured refresh count has been reached, and wherein said refreshing comprises:
  transmitting, by said proxy software application to said resource server, a request for a new session key;
  retrieving, by said proxy software application from said internal session cache, said first session key;
  transmitting, by said proxy software application to said resource server, said first session key, wherein said first session key currently comprises a valid and almost expired session key;
  receiving, by said proxy software application from said resource server in response to said request, a second session key associated with said resource server;
  calculating, by said proxy software application, a second specified stale time associated with said second session key, wherein said calculating said second specified stale time comprises adding said master refresh period to a second current time;
  generating, by said proxy software application from said first updated refresh count, a second updated refresh count;
  removing, by said proxy software application from said internal session cache, said first specified stale time and said first updated refresh count; and
  storing within said internal session cache, by said proxy software application, said second session key, said second updated refresh count, and said second specified stale time.

9. The computer program product of claim 8, wherein said method further comprises:
  establishing, by said proxy software application, a trust relationship between said proxy software application and a requestor;
  receiving, by said proxy software application from said requestor, a resource request for retrieving a resource from said resource server;
  retrieving, by said proxy software application from said internal session cache, said second session key;
  transmitting, by said proxy software application to said resource server, said resource request and said second session key;
  receiving, by said proxy software application from said resource server in response to said resource request, a third session key and a first resource;
  calculating, by said proxy software application, a third specified stale time associated with said third session key, wherein said calculating said third specified stale time comprises adding said refresh period to a third current time;
  generating, by said proxy software application, a third updated refresh count;
  removing, by said proxy software application from said internal session cache, said second specified stale time and said second updated refresh count;
  storing within said internal session cache, by said proxy software application, said third session key, said third updated refresh count, and said third specified stale time; and
  transmitting, by said proxy software application, said first resource to said requester.

10. The computer program product of claim 8, wherein said generating said first updated refresh count comprises decrementing said refresh count.

* * * * *